United States Patent
Bjontegaard et al.

(10) Patent No.: US 8,139,101 B2
(45) Date of Patent: Mar. 20, 2012

(54) PRE-PROCESSING OF VIDEO DATA

(75) Inventors: Gisle Bjontegaard, Oppegard (NO); Mattias Ahnoff, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 1329 days.

(21) Appl. No.: 11/755,487

(22) Filed: May 30, 2007

(65) Prior Publication Data

US 2008/0056376 A1 Mar. 6, 2008

(30) Foreign Application Priority Data

May 31, 2006 (NO) .................................. 20062485

(51) Int. Cl.
H04N 7/14 (2006.01)

(52) U.S. Cl. ............... 348/14.12; 348/14.13; 348/14.08; 375/240.24

(58) Field of Classification Search .... 348/14.01–14.16; 375/240.13, 240.24
See application file for complete search history.

(56) References Cited

U.S. PATENT DOCUMENTS

| | | | |
|---|---|---|---|
| 6,064,450 A | | 5/2000 | Canfield et al. |
| 6,160,848 A | * | 12/2000 | Sivan ........................ 375/240.13 |
| 6,192,148 B1 | * | 2/2001 | Lin ............................... 382/166 |
| 6,614,845 B1 | | 9/2003 | Azadegan |
| 2002/0106021 A1 | | 8/2002 | Yang et al. |
| 2003/0185303 A1 | | 10/2003 | Hall et al. |
| 2004/0264575 A1 | | 12/2004 | Bjontegaard |
| 2005/0013496 A1 | | 1/2005 | Bruls et al. |
| 2006/0158509 A1 | * | 7/2006 | Kenoyer et al. ............ 348/14.08 |

FOREIGN PATENT DOCUMENTS

| | | |
|---|---|---|
| EP | 0 778 707 A2 | 6/1997 |
| EP | 1 276 330 A2 | 1/2003 |
| WO | WO 03/053066 A1 | 6/2003 |
| WO | WO 03/079681 A1 | 9/2003 |
| WO | WO 03/107677 A1 | 12/2003 |
| WO | WO 2004/056125 A1 | 7/2004 |

OTHER PUBLICATIONS

Yafan Zhao, et al., "Macroblock classification for complexity management of video encoders", Signal Processing: Image Communications, vol. 18, No. 9, Oct. 2003, pp. 801-811.

Sharad Sharma, et al., "Pre-decision strategy for Coded/Non-coded MBs in MPEG4", 2004 International Conference on Signal Processing & Communications, XP010810477, Dec. 11, 2004, pp. 501-505.

Cliff Reader, "History of MPEG Video Compression"—Ver. 4.0, Draft. History of MPEG Video Compression, XP000962458, version 4.0, Nov. 14, 2005, pp. 1-99.

(Continued)

*Primary Examiner* — Melur Ramakrishnaiah
(74) *Attorney, Agent, or Firm* — Oblon, Spivak, McClelland, Maier & Neustadt, L.L.P.

(57) ABSTRACT

A method including: obtaining, with the video processing apparatus, video frames, the video frames including macroblocks; comparing, with a video processing apparatus, a current macroblock in a current frame stored in a current frame buffer with a corresponding reference macroblock in a reference frame stored in a reference frame buffer; and setting, with the video processing apparatus, a flag value for said current macroblock if the comparing indicates that the current macroblock and the corresponding reference macroblock are substantially different.

13 Claims, 5 Drawing Sheets

OTHER PUBLICATIONS

Xuan Jing, et al., "An Efficient Inter Mode Decision Approach for H.264 Video Coding, " IEEE International Conference on Multimedia and Expo, XP010771018, vol. 2, Jun. 27, 2004, pp. 1111-1114.

Staffan Ericsson, Fixed and Adaptive Predictors for Hybrid Predictive/Transform Coding, IEEE Transactions on Communications, XP000577278, vol. 33, No. 12, Dec. 12, 1985, pp. 1291-1302.

* cited by examiner

PRE-PROCESSING OF VIDEO DATA

FIELD OF THE INVENTION

The invention is related to pre-processing of video data before coding and transmission.

BACKGROUND OF THE INVENTION

Transmission of moving pictures in real-time is employed in several applications like e.g. video conferencing, net meetings, TV broadcasting and video telephony.

Digital video is typically described by representing each pixel in a picture with 8 bits (1 Byte) or more. Such uncompressed video data results in large bit volumes, and cannot be transferred over conventional communication networks and transmission lines in real time due to bandwidth limitations.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits. For delay and processor resource concerns, it is also important to keep the processing time and consumption on a minimum.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is typically performed on square block sizes (e.g. 16×16 pixels). Encoders based on motion vectors are often referred to as motion-based encoders.

Note that in some cases, like in H.264/AVC predictions of pixels based on the adjacent pixels in the same picture rather than pixels of preceding pictures are used. This is referred to as intra prediction, as opposed to inter prediction.

The residual represented as a block of data (e.g. 4×4 pixels) still contains internal correlation. A well-known method of taking advantage of this is to perform a two dimensional block transform. In H.263 an 8×8 Discrete Cosine Transform (DCT) is used, whereas H.264 uses a 4×4 integer type transform. This transforms 4×4 pixels into 4×4 transform coefficients and they can usually be represented by fewer bits than the pixel representation. Transform of a 4×4 array of pixels with internal correlation will most probably result in transform coefficients much more suited for further compression than the original 4×4 pixel block.

A macro block is a part of the picture consisting of several sub blocks for luminance (luma) as well as for chrominance (chroma).

There are typically two chrominance components (Cr, Cb) with half the resolution both horizontally and vertically compared with luminance.

This format is in some contexts denoted as YUV 4:2:0. The abbreviation is not very self-explanatory. It means that the chrominance has half the resolution of luminance horizontally as well as vertically. For the conventional video format CIF, this means that a luminance frame has 352×288 samples whereas each of the chrominance components has 176×144 samples.

This is in contrast to for instance RGB (red, green, blue) which is typically the representation used in the camera sensor and the monitor display. FIG. 1 illustrates a typical denotation and grouping of pixels in a macroblock for luminance and chrominance, respectively. The macroblock consists of 16×16 luminance pixels and two chrominance components with 8×8 pixels each. Each of the components is here further broken down into 4×4 blocks, which are represented by the small squares. For coding purposes, both luma and chroma 4×4 blocks are grouped together in 8×8 sub blocks and designated Y0-Y3 and Cr, Cb.

In digital video applications such as video conferencing, large parts of the image often do not change considerably between consecutive frames. From the perspective of a motion-based encoder as described above, this means that many macro-blocks often do not differ considerably from their reference macro-blocks, i.e. the previous macro-blocks. Thus, the motion vectors for those blocks are zero. Yet, for such an encoder to conclude that a macro-block is unchanged or that it has indeed changed but by such small an amount that the residual after motion compensation falls below the quantization threshold, it still has to read all the data of the new macro-block and compare it to a reference macro-block.

FIG. 1 is block diagram of a typical frame buffer arrangement inside a camera between the camera sensor and the encoder. The sensor consecutively feeds an image processing part with raw pixel data. The last frame is at all times residing in the new frame buffer, and the preceding frame is stored in the reference frame buffer.

As an encoder would typically store both data for the current frame and the reference frame in off-chip memory, it would be advantageous if the encoder knew beforehand that a particular macroblock is similar to the reference macroblock. Then it would not have to do the comparison with the reference macroblock, and more importantly it would not have to access these blocks of the new frame buffer in the camera. For cache-based encoders, additionally less cache thrashing would occur.

Also, for a real-time encoder implementation it might be advantageous for the encoder to know how many of the blocks that have changed compared to the reference frame without having to read the actual data. With that information, the encoder can more easily optimize quality within its given processing power limitations.

SUMMARY OF THE INVENTION

The present invention provides a method for pre-processing consecutive video frames to be coded in a video codec captured by a camera sensor, the video frames comprising macroblocks.

The method is indicated in the appended independent claim.

Further features consistent with the invention are indicated in the dependent claims.

BRIEF DESCRIPTION OF THE DRAWINGS

In order to make the invention more readily understandable, the discussion that follows will refer to the accompanying drawing.

DETAILED DESCRIPTION OF THE PRESENT INVENTION

The present invention includes a method and a system of interaction between a camera and a codec in a video conference arrangement. The main idea of the present invention is to detect changes in macroblocks in subsequent image frames captured by the camera sensor by making comparisons between macroblocks in the current frame and macroblocks from corresponding locations inside a reference frame, and provide the result of the comparison to the encoder together with the image data.

The comparison between the macroblocks includes threshold values so as to prevent false indications of changes due to camera noise.

Figure 1:
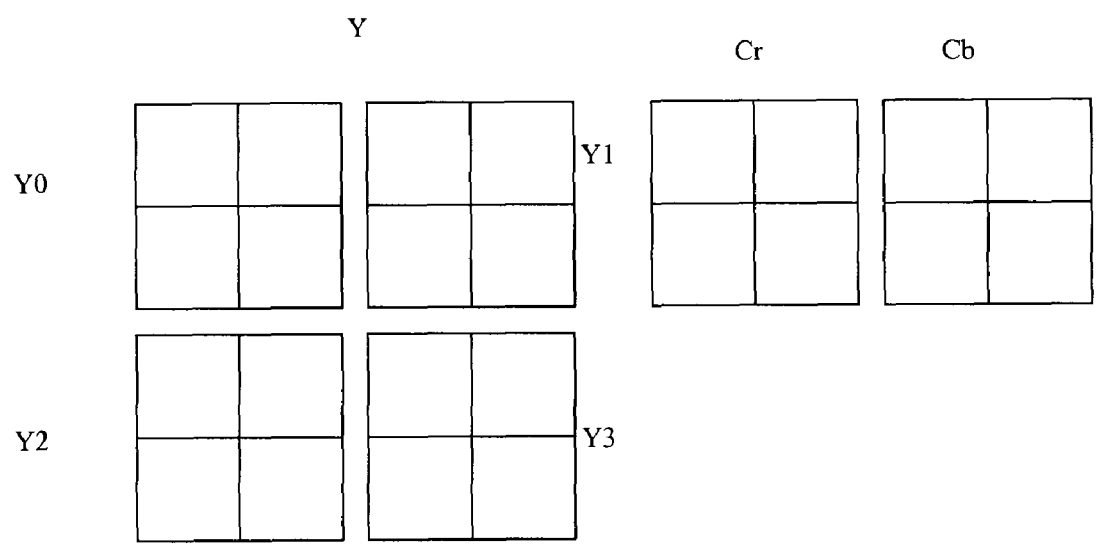
FIG. 1 symbolically illustrates the difference between chrominance and luminance denotation in a macroblock.
Figure 2:
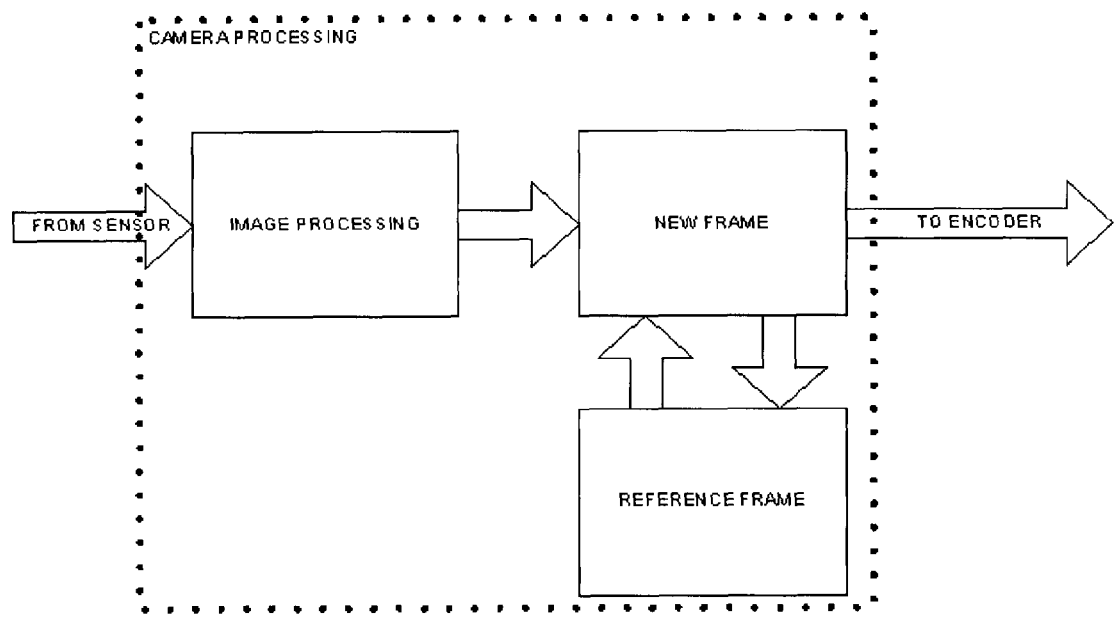
FIG. 2 illustrates a frame buffer inside a camera processing block.

As illustrated in FIG. 2, the reference frame is a buffer inside the camera that for every new frame gets updated on a per macroblock level based on the results of the comparison between the current frame and the reference frame itself.

The encoder will then have the choice of selectively accessing blocks in the image based on the results of the comparison carried out in the camera so that blocks of data that are indicated as similar to the reference do not even have to be read by the encoder.

In the following an example embodiment of how the present invention could be carried out is described. It details how a macroblock comparison scheme can be carried out in order to be efficient both with regards to quality and CPU processing resources.

The objective of the method in this example is to generate flags indicating changes or not on a per macroblock basis. The decision for each macroblock is made by means of the threshold comparison described below.

The macroblocks in the example will be denoted in mathematical terms. Let $YN_{ij}$, $UN_{kl}$, and $VN_{kl}$, be the luminance and chrominance samples that together comprise a macroblock in the current frame N which is stored in the new frame buffer in FIG. 2. For the case of YUV4:2:0, $i,j=0 \ldots 15$ and $k,l=0 \ldots 7$.

Likewise, let $YR_{ij}$, $UR_{kl}$ and $VR_{kl}$ be the samples of the corresponding macroblock in the reference frame buffer R.

Let $Y_{ij}=YN_{ij}-YR_{ij}$, $U_{kl}=UN_{kl}-UR_{kl}$ and $V_{kl}=VN_{kl}-VR_{kl}$ be the difference on a per-sample basis between samples in the current frame and samples in the reference frame. The set of all $Y_{ij}$ is called Y for short and similarly the set of all $U_{kl}$ is called U and all $V_{kl}$ is called V.

Let s=sum(Y) and let w(s) be some weighting function that is reasonably easy to compute and that typically would have property that $dw(s)/ds <= 0$ Further, let Dn be subsets of Y, U and V with corresponding constant threshold values Tn. Then for each n, let $$Qn = \begin{cases} 1, & \text{if } |sum(Dn)| * w(s) > Tn \\ 0, & \text{otherwise} \end{cases} \quad (1)$$

be a requirement on each Dn. Then, according to one embodiment of the present invention, the macroblock is marked as new if and only if at least one of the requirements Qn are nonzero.

Figure 3:
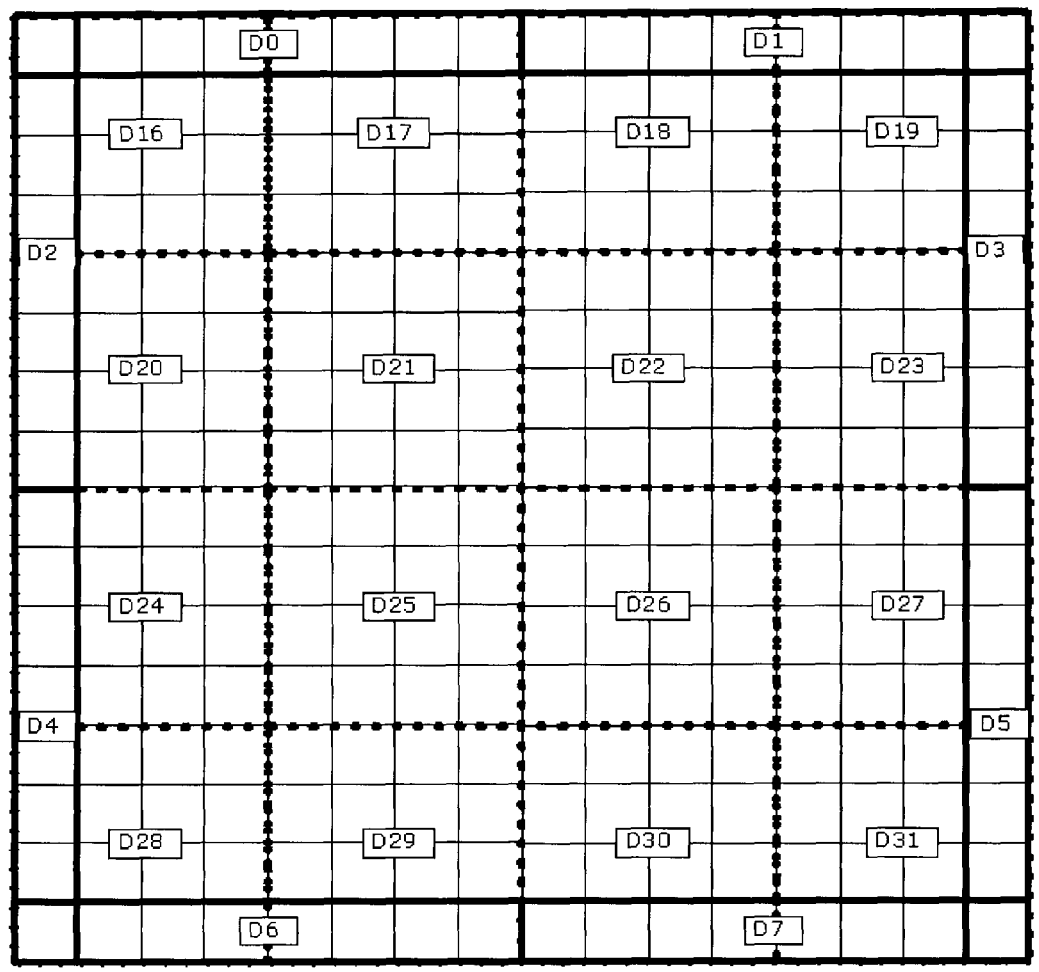
FIG. 3 shows the subset partition of a 16×16 luminance macroblock Y according to one embodiment of the present invention.
Figure 4:
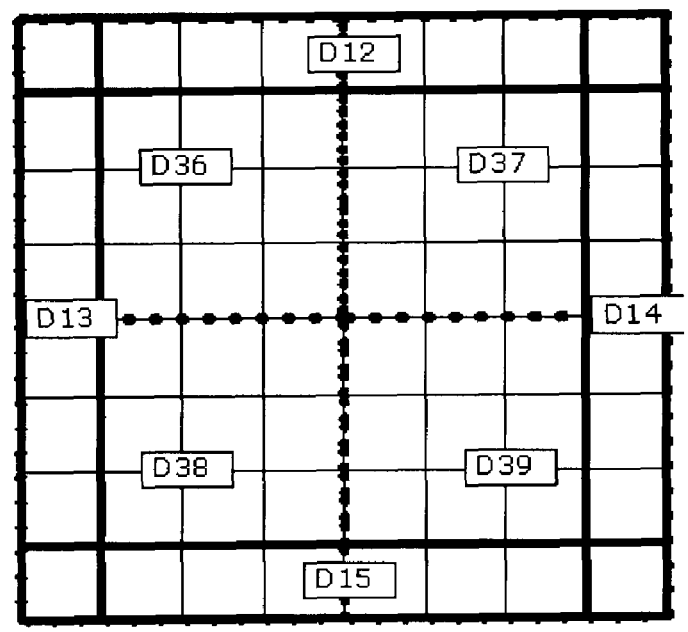
FIG. 4 shows the subset partition of a 8×8 chrominance macroblock for U and V respectively according to one embodiment of the present invention.
Figure 4:
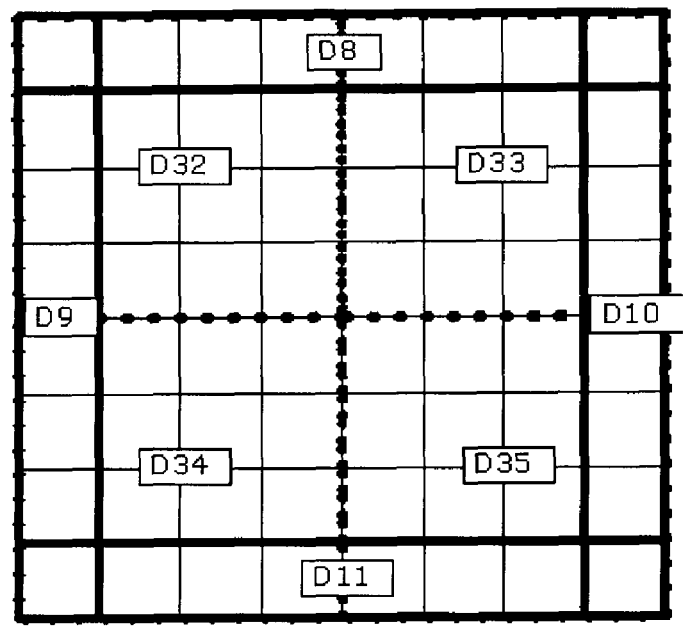

As illustrated in FIGS. 3 and 4, Y, U and V are divided into Dn of 4×4 squared subsets and 1×8 border subsets. The border subsets are used to detect changes in the border zones, so as to avoid "cutting edges" in the image. Note that by including w(s) in the decision expression (1), the threshold values are effectively altered so that smaller changes cause the flag to be set in dark macroblocks (where sum(Y) is small) than in lighter macroblocks (where sum(Y) is larger). This is for the purpose of avoiding ignoring minor overall, but actual changes that is not associated with noise.

Upon being marked as new, R is updated with the values from N. That is, $YR_{ij}$ is replaced by $YN_{ij}$, $UR_{kl}$ is replaced by $UN_{kl}$ and $VR_{kl}$ is replaced by $VN_{kl}$ for all i, j, k and m. In case the macroblock was not marked as new, then R remains unchanged at the particular macroblock position. This means that the reference buffer contains the last flagged macroblock at any given position. Note that this is not exactly the same data as the previous frame, it is just very similar.

Collected over a whole frame, this marking information will constitute a bitmap or collection of flags where each bit will denote whether a particular macroblock was marked as new or not. This bitmap can either be sent from the camera to the codec over a separate channel if available, or it can be embedded in the picture bitstream itself, i.e. in each pixel data, by forcing the least significant bit of for instance YN00 to 1 to indicate 'new' and to 0 otherwise. Embedding the information in the picture in this way has the advantage that no separate channel is needed and also, since the data is self-contained, image cropping can easily be performed at the receive side without loss of the flagging data.

As an example, let De, $e=0 \ldots 15$ denote sixteen sets of 1×8 edge samples as shown in the figures in section 4. Let Db, $b=16 \ldots 39$ denote twenty-four sets of 4×4 samples, also shown in the figures. Let Dp, $p=40 \ldots 423$ denote the 384 individual samples in Y, U and V.

Let Te=C1 for all e. That is, C1 is a constant value that is independent on e. Similarly, let Tb=C2 for all b, and let Tp=C3 for all p. Finally, we chose w(s)=1/s That is, the macroblock is flagged as new if the magnitude of any 1×8 edge sum is greater than C1\*s OR if the magnitude of a summation of any of the 4×4 sample blocks is greater than C2\*s OR if at least one of $Y_{ij}$, $U_{kl}$ and $V_{kl}$ has a magnitude greater than C3\*s. The result is then incorporated as 1 or 0 in the least significant bit in the pixel data for YN00.

Figure 5:
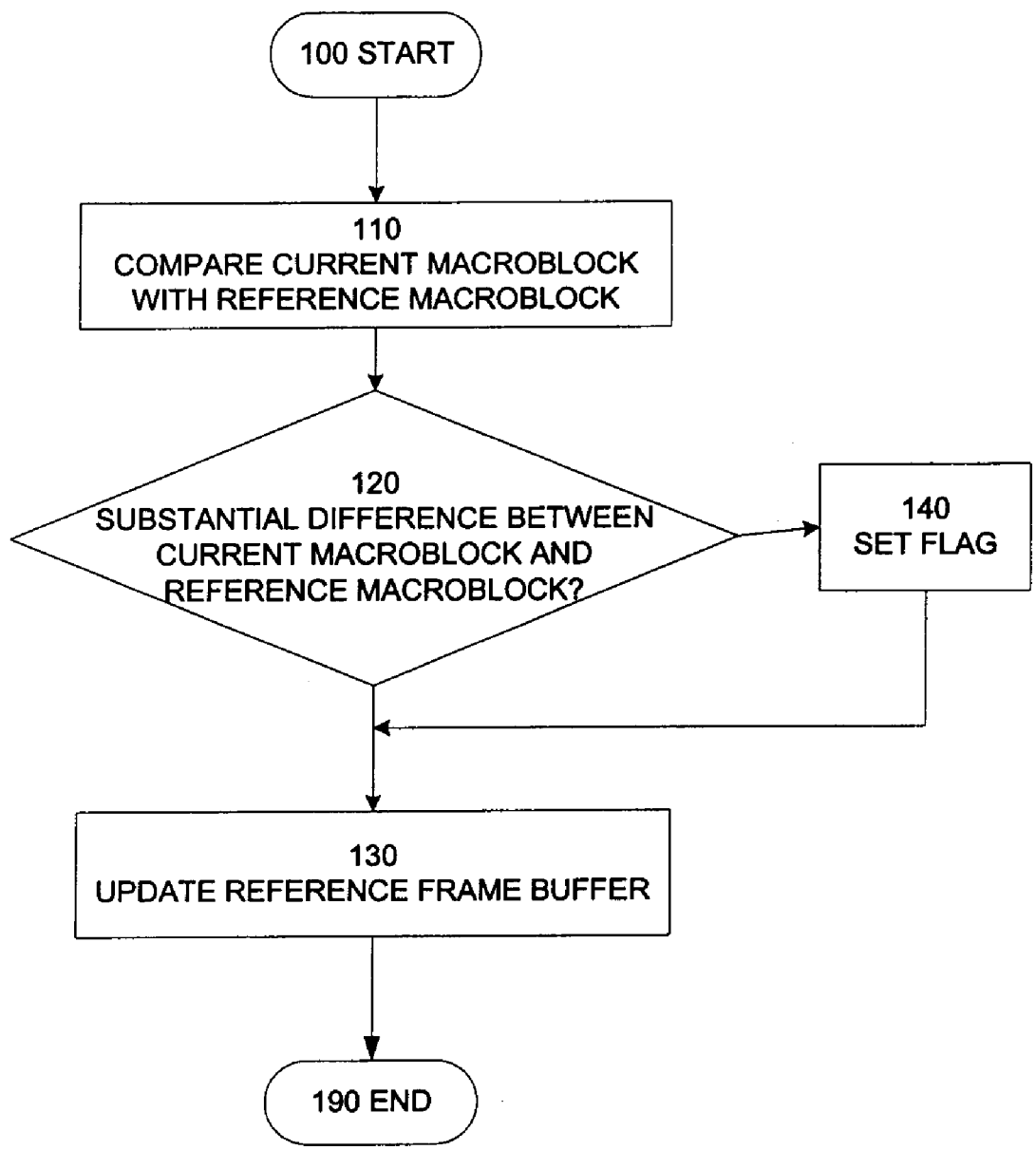
FIG. 5 is a schematic flow chart further illustrating a preprocessing method in accordance with the invention.

FIG. 5 is a schematic flow chart further illustrating a preprocessing method consistent with the principles of the invention.

The method is based on consecutive video frames containing macroblocks as input. The video frames are captured by a camera sensor. The method provides preprocessing of the macroblocks prior to subsequent coding in a video codec.

The method starts at the initiating step 100.

In step 110 a current macroblock in a current frame stored in a current frame buffer is compared with a corresponding reference macroblock in a reference frame stored in a reference frame buffer.

Next, in the determining step 120, it is determined if the comparing indicates that the current macroblock and the corresponding reference macroblock are substantially different. If this is the case, step 140 is performed, wherein a flag value for said current macroblock is set, e.g. by assigning the value 1. Subsequent to the flag setting step 140 the method continues at step 130.

If the current macroblock and the corresponding reference macroblock are not substantially different, the method continues directly at step 130.

In the determining step 120, the current macroblock and the corresponding reference macroblock are determined as substantially different if the difference between the current macroblock and the corresponding reference macroblock is greater than expected noise fluctuations between the video frames.

In step 130 the reference frame buffer is updated. More specifically, current macroblocks for which associated flag values are set are copied from the current frame buffer to the reference frame buffer.

Consistent with further principles of the invention, the comparing step 110 further includes creating a residual macroblock by calculating a respective difference value for all pixels in a macroblock by respectively subtracting all pixels in the current macroblock from all corresponding pixels in the reference macroblock, respectively dividing the residual macroblock into subsets $D_n$, wherein n denotes an index of a subset, and executing a sub-comparison for each $D_n$ by comparing a multiplication of a sum of values in $D_n$ and a weighting function (w) with a threshold value $T_n$.

Then, in the determining step 120, the current macroblock and the corresponding reference macroblock are determined as substantially different if the multiplication is greater than $T_n$ for one or more of the subsets.

In an embodiment, the weighting function w is a function of the sum (s) of the respective difference values in the residual macroblock. Also, dw(s)/ds is less than or equal to zero.

In an embodiment, the residual macroblock is divided into Dn's of 4×4 in addition to overlapping Dn's of 1×8 and 8×1 located at the borders of the macroblock.

Further consistent with an embodiment, the flag values related to each respective current macroblocks comprises a bitmap. Each bit in the bitmap denotes whether the current macroblock and the corresponding reference macroblock are substantially different.

In an embodiment the bitmap is transmitted to the codec in a separate channel. Alternatively, the bitmap may be embedded in a picture bitstream from the camera to the encoder.

The respective macroblocks may represent luminance and/or chrominance values for the respective video frames.

The encoder and the camera may be connected to a High Definition video conference terminal.

For simplicity of explanation the method is illustrated as terminating at the terminating step 190 subsequent to the updating step 130. However, it should be understood that the illustrated process may be repeated, using another macroblock in the video frames to be coded as the current macroblock.

The invention claimed is:

1. A method comprising:
    obtaining, with a video processing apparatus, video frames, the video frames including macroblocks;
    comparing, with the video processing apparatus, a current macroblock in a current frame stored in a current frame buffer with a corresponding reference macroblock in a reference frame stored in a reference frame buffer;
    setting, with the video processing apparatus, a flag value for said current macroblock if the comparing indicates that the current macroblock and the corresponding reference macroblock are substantially different;
    creating, with the video processing apparatus, a residual macroblock by calculating a respective difference value for all pixels in a macroblock by respectively subtracting all pixels in the current macroblock from all corresponding pixels in the corresponding reference macroblock;
    respectively dividing, with the video processing apparatus, the residual macroblock into subsets $D_n$, wherein n denotes an index of a subset; and
    executing, with the video processing apparatus, a sub-comparison for each $D_n$ by comparing a multiplication of a sum of values in $D_n$ and a weighting function (w) with a threshold value $T_n$,
    wherein the current macroblock and the corresponding reference macroblock are determined as substantially different if the multiplication is greater than $T_n$ for one or more of said subsets.

2. The method according to claim 1, wherein the current macroblock and the corresponding reference macroblock are determined as substantially different if a difference between the current macroblock and the corresponding reference macroblock is greater than expected noise fluctuations between the video frames.

3. The method according to claim 1 or 2, further comprising:
    updating the reference frame buffer by copying from the current frame buffer to the reference frame buffer current macroblocks for which associated flag values are set.

4. The method according to claim 1, wherein the weighting function w is a function of a sum (s) of the respective difference values in the residual macroblock, dw(s)/ds being less than or equal to zero.

5. The method according to claim 1 or 4, wherein the residual macroblock is divided into Dn's of 4×4 in addition to overlapping Dn's of 1×8 and 8×1 located at borders of the residual macroblock.

6. The method according to claim 1, wherein the step of setting the flag value includes assigning a value of 1.

7. The method according to claim 1, further comprising:
    forming a bitmap from flag values related to current macroblocks of the current frame, each bit in the bitmap denoting whether the current macroblocks of the current frame and their corresponding reference macroblocks are, respectfully, substantially different.

8. The method according to claim 7, wherein the bitmap is transmitted to a video codec in a separate channel.

9. The method according to claim 7, wherein the bitmap is embedded in a picture bitstream from the video processing apparatus to a video codec.

10. The method according to claim 1, wherein the current macroblock represents luminance and/or chrominance values for the current frame.

11. The method according to claim 1, wherein the video codec and the video processing apparatus are connected to a High Definition video conference terminal.

12. The method according to claim 1, further comprising altering a least significant bit in the current macroblock to embed the flag value in the current macroblock.

13. The method according to claim 1, wherein the video processing apparatus is included in a camera.

* * * * *